United States Patent
Fazlyev et al.

(10) Patent No.: US 11,470,028 B1
(45) Date of Patent: Oct. 11, 2022

(54) SYSTEM AND METHOD FOR ADDING INTERACTIVITY AND DYNAMIC DATA TO E-COMMERCE EMAILS

(71) Applicant: ECWID Inc., Encinitas, CA (US)

(72) Inventors: Ruslan Fazlyev, Moscow (RU); Erik Suhonen, Los Angeles, CA (US); Den Nikiforov, Moscow (RU); Alexander Dryantsov, Moscow (RU); Alexey Radionov, Moscow (RU)

(73) Assignee: Ecwid, Inc., Encinitas, CA (US)

( * ) Notice: Subject to any disclaimer, the term of this patent is extended or adjusted under 35 U.S.C. 154(b) by 0 days.

(21) Appl. No.: 17/119,666

(22) Filed: Dec. 11, 2020

Related U.S. Application Data (60) Provisional application No. 62/947,478, filed on Dec. 12, 2019.

(51) Int. Cl.
| | |
|---|---|
| *H04L 51/18* | (2022.01) |
| *G06Q 10/08* | (2012.01) |
| *G06Q 30/02* | (2012.01) |
| *H04L 51/08* | (2022.01) |
| *G06Q 30/06* | (2012.01) |

(52) U.S. Cl.
CPC ......... *H04L 51/18* (2013.01); *G06Q 10/0833* (2013.01); *G06Q 30/0282* (2013.01); *G06Q 30/0629* (2013.01); *G06Q 30/0631* (2013.01); *H04L 51/08* (2013.01)

(58) Field of Classification Search
CPC ......... H04L 51/18; H04L 51/08; H04L 51/00; H04L 51/34; H04L 51/24; H04L 51/063; G06Q 10/0833; G06Q 30/0282; G06Q 30/0629; G06Q 30/0631; G06Q 10/107; G06Q 30/02

See application file for complete search history.

(56) References Cited

U.S. PATENT DOCUMENTS

| | | | | |
|---|---|---|---|---|
| 6,463,461 | B1 * | 10/2002 | Hanson ............... | G06Q 10/107 709/204 |
| 7,222,156 | B2 * | 5/2007 | Gupta ................. | G06F 40/169 715/752 |
| 7,587,678 | B1 * | 9/2009 | English .............. | G06Q 10/107 715/752 |
| 7,860,803 | B1 * | 12/2010 | Chang ................ | G06Q 20/367 705/50 |
| 8,489,880 | B1 * | 7/2013 | Gagnon .............. | H04L 9/3236 713/176 |
| 2004/0019643 | A1 * | 1/2004 | Zirnstein, Jr. ....... | H04L 51/18 709/206 |

(Continued)

*Primary Examiner* — Caroline H Jahnige
*Assistant Examiner* — Hassan A Khan
(74) *Attorney, Agent, or Firm* — Bardmesser Law Group (57) ABSTRACT

A system for interactive e-commerce using email, includes a server running an e-commerce website and a supporting database; the server sending an order confirmation email to a user in response to a user purchase; the email containing an interactivity script and an update script; wherein, upon the user using an email client to render the email, the interactivity script connects to the server and provides the user with an interface for feedback to the e-commerce website regarding the user purchase; and wherein, upon the user using the email client to render the email, the update script connects to the server and provides the user with an updated status of the purchase based on data in the supporting database.

12 Claims, 7 Drawing Sheets

(56) References Cited

U.S. PATENT DOCUMENTS

| | | | |
|---|---|---|---|
| 2005/0267937 A1* | 12/2005 | Daniels | H04L 51/00 709/206 |
| 2007/0011258 A1* | 1/2007 | Khoo | G06F 3/0482 709/206 |
| 2007/0244977 A1* | 10/2007 | Atkins | H04L 51/063 709/206 |
| 2008/0162923 A1* | 7/2008 | Arnold | G06Q 10/107 713/150 |
| 2009/0099901 A1* | 4/2009 | Sah | G06F 16/951 707/999.005 |
| 2009/0248806 A1* | 10/2009 | Teman | G06Q 30/02 709/206 |
| 2011/0093393 A1* | 4/2011 | Chang | G06Q 10/10 705/347 |
| 2011/0184793 A1* | 7/2011 | Bohannon | G06Q 30/0226 709/236 |
| 2012/0054289 A1* | 3/2012 | Aytulu | G06Q 10/107 709/206 |
| 2014/0143350 A1* | 5/2014 | Ortmann | G06Q 10/107 709/206 |
| 2015/0095073 A1* | 4/2015 | Li | G06Q 30/0269 705/6 |
| 2015/0156151 A1* | 6/2015 | Sheory | H04L 51/18 715/236 |
| 2015/0186390 A1* | 7/2015 | Katie | H04L 67/568 709/203 |
| 2015/0341292 A1* | 11/2015 | Ahmed | H04L 67/01 709/206 |
| 2015/0356579 A1* | 12/2015 | Brondstetter | G06Q 30/0203 705/7.32 |
| 2016/0359684 A1* | 12/2016 | Rizqi | H04L 67/289 |
| 2017/0163724 A1* | 6/2017 | Puri | H04L 67/568 |
| 2017/0228763 A1* | 8/2017 | Isenberg | G06Q 30/0282 |
| 2018/0204272 A1* | 7/2018 | Sargeant | H04L 51/063 |
| 2018/0219830 A1* | 8/2018 | O'Brien | H04L 51/48 |
| 2019/0019236 A1* | 1/2019 | Kim | H04L 51/10 |
| 2020/0110791 A1* | 4/2020 | Khoo | H04W 84/005 |

* cited by examiner

1-click review

FIG. 1

Quick verify

SYSTEM AND METHOD FOR ADDING INTERACTIVITY AND DYNAMIC DATA TO E-COMMERCE EMAILS

CROSS REFERENCE TO RELATED APPLICATIONS

This application is a non-provisional of U.S. Provisional Application No. 62/947,478, filed on Dec. 12, 2019.

BACKGROUND OF THE INVENTION

Field of the Invention

The present invention relates to emails, and, more particularly, to adding functionality to emails, such as interactivity and display of dynamic data (e.g., shipping/e-commerce data) within the emails, with minimal load on the user.

Description of the Related Art

Companies selling products (i.e., sellers/merchants) rely heavily on email to be able to communicate with their prospects and customers. Email is an important form of communication in commerce, yet email has some fundamental inadequacies. For example, email has been static (lacks user interaction like the web) and email is not updatable (the information in the email becomes outdated quickly). Lack of interactivity and dynamic data causes problems for sellers and customers. Sellers have to try to get the customer to their website, where they can have interactive, updated data. Many customers don't take this extra step, so the seller loses that potential sale. Customers can't interact with the email in the way that they can on the web, and they don't know if the information in the email is outdated, which causes confusion and lower customer satisfaction. Overall, both the seller and customer lose.

SUMMARY OF THE INVENTION

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

In one aspect, a system for interactive e-commerce using email, includes a server running an e-commerce website and a supporting database; the server sending an order confirmation email to a user in response to a user purchase; the email containing an interactivity script and an update script; wherein, upon the user using an email client to render the email, the interactivity script connects to the server and provides the user with an interface for feedback to the e-commerce website regarding the user purchase; and wherein, upon the user using the email client to render the email, the update script connects to the server and provides the user with an updated status of the purchase based on data in the supporting database.

Optionally, the update script provides the user with shipping status of the purchase. Optionally, the update script provides the user with updated recommendations of products for the user to purchase. Optionally, the update script provides the user with updated prices on similar products for the user to purchase. Optionally, the rendering includes opening a window for the email. Optionally, the rendering includes showing a preview of the email. Optionally, the rendering includes opening a window for the email. Optionally, the update script downloads and shows a horizontal scroll with multiple products for purchase by the user. Optionally, the feedback includes rating the purchase in a product review. Optionally, the product review is provided to the e-commerce website via an API. Optionally, the feedback includes rating the user's purchasing experience.

In another embodiment, a method for interactive e-commerce using email, includes the steps of on a server running an e-commerce website and a supporting database, server sending an order confirmation email to a user in response to a user purchase; the email containing an interactivity script and an update script; upon the user using an email client to render the email, the interactivity script connecting to the server and providing the user with an interface for feedback to the e-commerce website regarding the user purchase; and upon the user using the email client to render the email, the update script connecting to the server and provides the user with an updated status of the purchase based on data in the supporting database.

In another embodiment, a non-transitory computer program product for interactive e-commerce using email, includes on a hardware server running an e-commerce website and a supporting database, computer program product means for the server to send an order confirmation email to a user in response to a user purchase, the email containing an interactivity script and an update script; upon the user using an email client to render the email, computer program product means for the interactivity script connecting to the server and provide the user with an interface for feedback to the e-commerce website regarding the user purchase; and upon the user using the email client to render the email, computer program product means for the update script to connect to the server and provide the user with an updated status of the purchase based on data in the supporting database. The computer program product means include code on a non-transitory storage medium that the processor uses to perform the recited steps.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The proposed concept solves the above problems with new interactivity and dynamic content in emails. The emails include both HTML and AMP code. If the user has an email client that supports AMP, then the email client will render the AMP code. If the email client does not support AMP, then it will render the HTML code. The AMP code in the email works with the email client to create a new experience, including both interactivity and dynamic (real-time) content. The data flow is bi-directional, both server-to-client and client-to-server.

With the new interactive experience, the user can interact with the email similar to how the user might interact with a web page, such as horizontal scrolling carousels of products for sale. The user can submit forms, such as clicking a button and/or filling out a form and submitting the form (such as product ratings and reviews). The data here is also bi-directional, both server-to-client and client-to-server.

The dynamic content technology uses client-server architecture, connecting the client and server through a network, typically the Internet. The client will check for updated content, and if there is updated content, then the technology will pull the updated data from the server and update the email content, so the user sees the most recent information at all times (assuming their email client is connected to the Internet).

The present invention is directed to unique concepts with technology that enables businesses and their customers to engage via email that dramatically improves their interactions and behaviors. The concepts are generally related to:
1. 1-Click Rating and Review
2. 1-Click Email Confirm
3. Up-to-date Order Notification
4. Order Management Emails have been using HTML code for many years, but recently emails can also contain AMP for Email code, in addition to the HTML. Email clients (e.g., Gmail) use the new AMP for Email code to deliver a more dynamic, engaging and interactive experience through email. AMP for Email was started in 2018 and opened up with an announcement in March 2019. Google announced AMP here: blog.amp.dev/2019/03/26/building-the-future-of-email-with-amp/ incorporated herein by reference in its entirety. An example of Google's launch event featuring ECWID is shown at youtube.com/watch?v=hTd67MGkNA&feature=youtu.be&t=289.

The concepts are implemented by leveraging AMP for email. AMP for Email developer documentation can be found at amp.dev/about/email incorporated herein by reference in its entirety. AMP for Email is part of the AMP Open Source Project. Details can be found at amp.dev/about/email. In essence, HTML-based emails have additional code added to them, which can be interpreted by the email client (many software vendors' new versions of their clients support AMP extensions) or by a plug-in added to a legacy client. A legacy mail client that does not have the additional code or plug-in for interpreting AMP will ignore the added code in the email, and the email will display as it would conventionally, without the extra functionality.

The invention implements AMP for email, which allows an email client or server-based email system to exchange data in near real time between users' emails and other servers and databases (for example, an online store or a backend of an online store). Specific code/script is contained in emails, as well as back-end code to send and receive data with the front-end code, and other services. An example of such a server-side script is in Appendix 1, although one of ordinary skill in the art would understand that this is just one example, and the invention is not limited to this specific script.

1-Click Rating and Review

Online ratings and reviews are critically important to many businesses, and yet businesses have a difficult time getting people to leave a rating or review because the process typically takes too much time and effort.

In many cases, the old process works as follows:
1. The consumer purchases a product from a merchant, for example, through the online store's platform (see ECWID.com, as one example).
2. Triggered by the consumer's purchase, the online store, on behalf of the merchant, then automatically sends an email to that consumer.
4. If the consumer goes to their email account (they have to log in with a username and password if they are not yet logged in) and if they open the email, the email will ask them to leave a rating and/or review for that merchant, by clicking on a button within the email which typically contains a web URL (e.g., https://www . . . ).
5. If the consumer clicks on the button, then the operating system will usually try to open a new web browser application, and then open a new window within that web browser. Overall, this is also problematic as it pulls the person out of the context of what they were doing in one application and tries to switch them to an entirely new application/new context.
6. The web browser need to be connected to the Internet to load the web page. If it is not, the person has to get it connected to the Internet for the web page to load.
7. If the web page loads, it will then ask the consumer to then leave a rating and/or review. Sometimes the consumer has to log in with a username and password, which sometimes they have forgotten the password to. To leave a rating or review, the consumer needs to click a 1-5 star rating, or fill out a review form with their comments on that merchant and then click a submit button.
8. The information is then securely saved their rating/review information in a backend database.
9. After that information in the database, the service takes the consumer to a new web page to let them know that their rating/review has been completed.
10. That rating/review information is typically displayed where the merchants wants it displayed.

Because there are so many steps and dependencies in the above process, many people won't complete all the steps to leave the rating or review. Merchants lose out on most opportunities to grow their ratings and reviews, which represents lost opportunities for the merchant.

The problems in the art are solved by using a new unique way of removing most of the above steps, which creates a new streamlined process for the consumer. A unique technology, using an interactivity script embedded in the email, is used in the email frontend and backend that allows a consumer to leave a rating or review right in the email, without leaving the email client. The consumer doesn't need to go to a web page to leave a rating or review. This is substantially better for the consumer and better for the merchant.

The new process is represented by four steps:

1. When the consumer opens the email, the "leave a rating/review" section in the email (not a link off to a web page) is shown. The customer selects 1-5 stars and/or fills out this review form and clicks the submit button in the email.

2. ECWID/online store securely saves their rating/review information in the backend database.

3. After securely saving the rating/review information in the database, a notification is displayed within that same email to that customer letting them know that their rating/review has been completed.

4. ECWID/online store then displays that rating/review information where the merchant wants it displayed.

The four steps of the proposed solution should be compared to nine steps in the conventional process.

Figure 1:
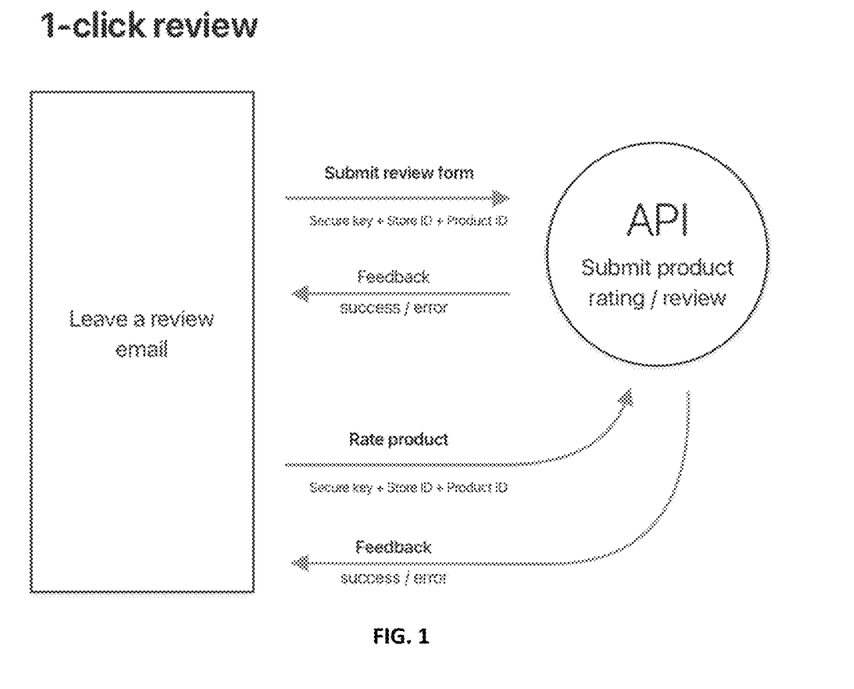
FIG. 1 shows a data flow for the 1-Click Rating and Review.

FIG. 1 shows a data flow for the 1-Click Rating and Review. As shown in the figure, the email is on the left and its bi-directional data flow with the server (via an API) is on the right. The user submits a review form where the email (client) sends the secure key, the store ID and the product ID to the server (database). The server side then records the information in the database and then sends a response back to the email (client), such as success or error. A similar process happens when the user submits information for rating a product. An interactive script embedded in the email permits the interactivity aspect.

1-Click Email Confirm

It's important to businesses allowing people to sign up for a service (e.g., a new account, a newsletter, etc.) that the email address submitted is both owned by the person and is not a bot (that is, it is a live human being). To try to accomplish this, it is a common practice for those companies to use an email confirmation process. However, this typical email confirmation process is highly problematic because many of the people do not finish the email confirmation process, since it is often time consuming and inconvenient.

The conventional process typically works as follows:

1. A person uses their email address to sign up for an online service in a web page, and then clicks a button like "Submit" to complete the submission.

2. The business system then automatically sends an email to the email address that the person entered in the web page.

3. The business web page then changes to a new web page instructing the person to check their email account for an email from that business, and follow the instructions in the email (to confirm the email address).

4. The person needs to either logged in to that email account with their username and password, or already be logged into their email account. If the person then goes to their proper email account, then they should find an email in their inbox.

5. If the person opens the email, the email usually asks that person to confirm their email address by clicking on a link with a web URL (e.g., "https://www . . . ") in the email.

6. If the person clicks on the link in the email, then the operating system should open a new web browser application, and then open a new window within that web browser. This requires that that device is connected to the Internet, so if it is not, then the person would first need to get the device connected to the Internet. Overall, this is also problematic as it pulls the person out of the context of what they were doing in one application and tries to switch them to a new application.

7. If that web page opens successfully, it will typically give the person a confirmation message that their email address has been confirmed, and then typically asks the user to take a next step to take an action like to log in to that account they just created.

Because there are so many steps and dependencies in the process of email confirmation, most people won't complete all the steps to confirm their email, which means that the service they are trying to use won't be available to them (until they finish that process, which sometimes requires that they start over from the beginning). It is required to redirect to 3rd-party website from email client to complete the confirmation process. It takes time and pull the customer out of the context. The customers know it and ignores email confirmation emails. The conversion rate decreases.

The proposed solution is much more streamlined as the person can confirm their email address without leaving their email client.

The new process is:

1. When the person opens that personalized email, the online store makes a fast request to endpoint to check the email address confirmation status securely. If the email address is not confirmed, then immediately a confirmation button is shown.

2. The person clicks the confirmation button with 1 click, and immediately sees a visual confirmation message (like "Thank you, your email address is now confirmed").

3. The email then sends the unique request to a specific endpoint that completes confirmation process on the backend.

4. Within the email, the email then shows a button for their next action (such as "Log in to your Control Panel"). The person doesn't need to scroll down the email to find that, as it's in the same place in the email UI as the confirmation request button and confirmation message were. This is better for the business and better for the customer.

Figure 2A:
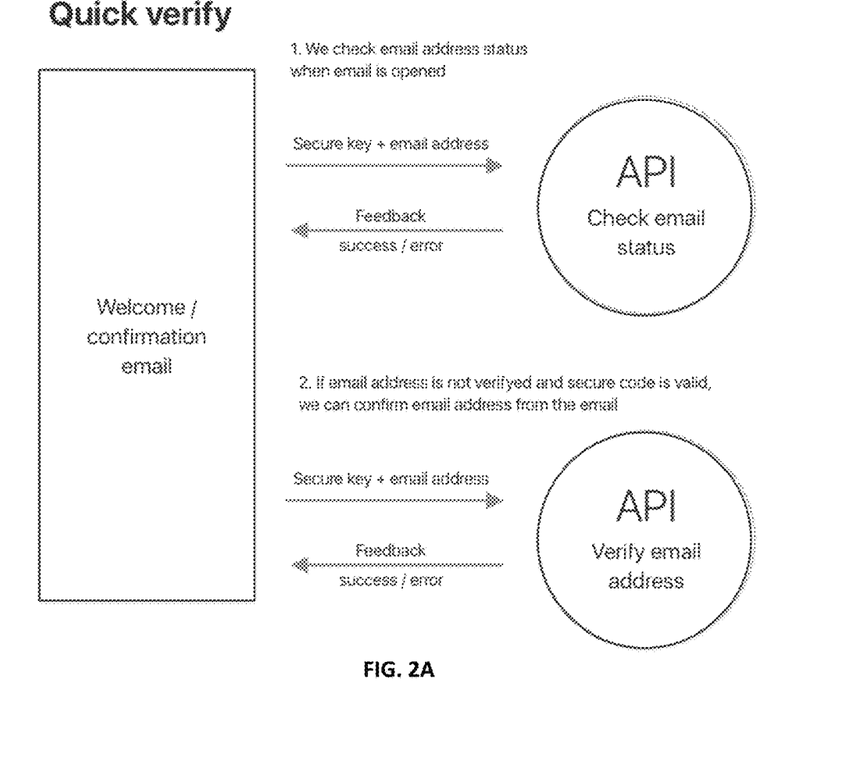
FIGS. 2A-2B show a data flow for 1-Click Email Confirm.
Figure 2B:
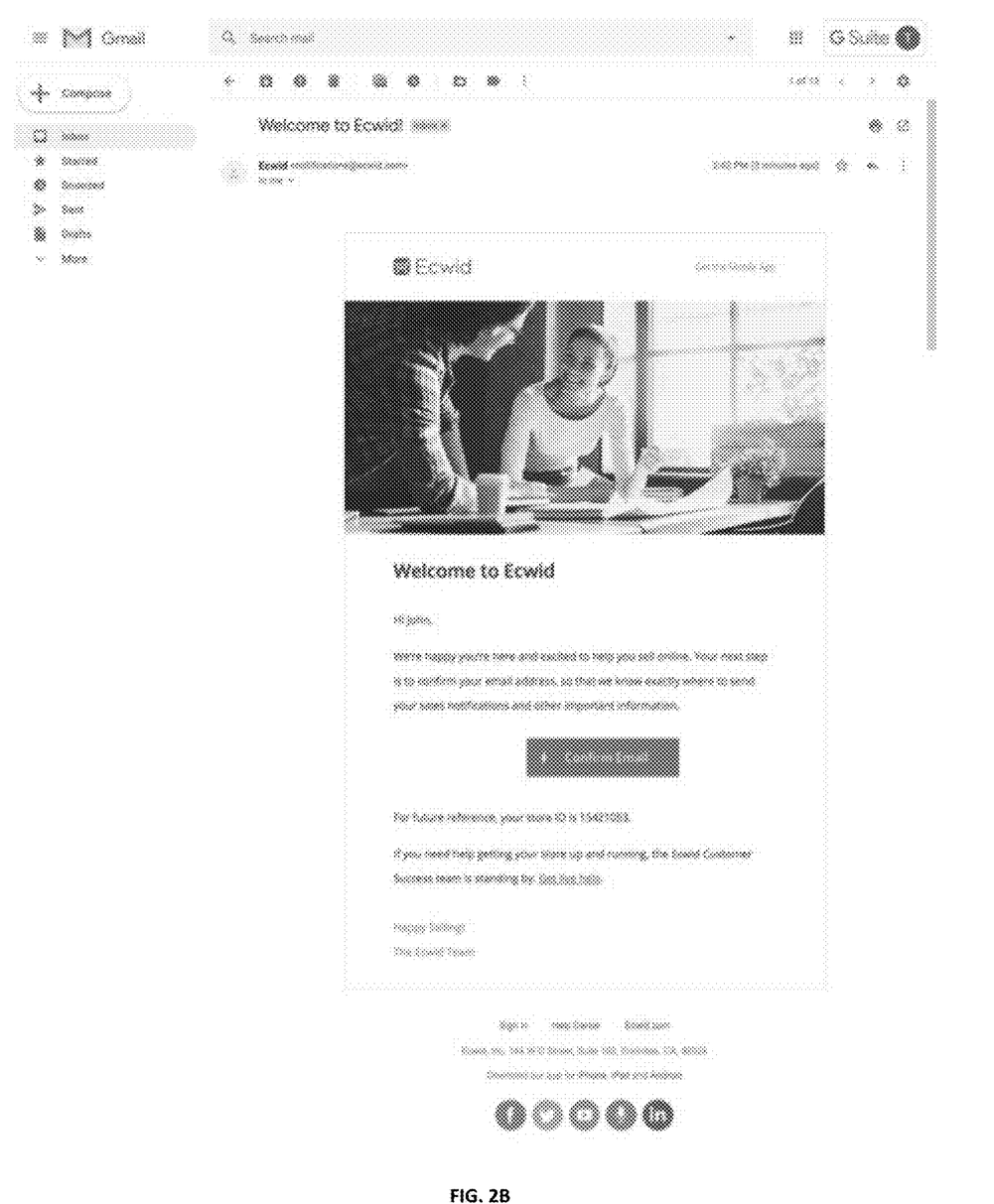

In summary, the 1-Click Email Confirm reduces the number of steps from approximately 3 steps to 1 step, which is better for both the business and person. FIGS. 2A-2B show a data flow for 1-Click Email Confirm, which utilizes a script embedded in the email.

Up-to-date Order Notification

The overall problem is that many consumers who make a purchase with a merchant use order the merchant's notification email, but the information in the email is often outdated. This is bad for the consumer as they don't get the information they want and may be misguided, and bad for the merchant as their customers become dissatisfied.

The following is the conventional order notification process:

1. A consumer places an order with a merchant.

2. The order automatically triggers an email to be sent from online store, on behalf of the merchant, to the consumer. The goal of the email is to let the consumer know the status of their order (such as "order placed" or "order shipped"). In some cases (including digital goods like software downloads), the "order placed" and "order ready for download" happen almost simultaneously.

3. The consumer reads the order notification email, including the order status. They typically assume that the email contains accurate info, but if they don't read it immediately or if the order status changes quickly, then they are being misled. For example, the email may say "order status: order placed", but the actual status of their order is "order shipped".

4. If they are unsure if the order status on the email is up to date, then they can go to the website to check the up-to-date order status, but that requires that the user take the next actions:

5. Open up a web browser application
6. Type in the URL
7. If they are not connected to the Internet, then they need to connect to the Internet.
8. Log in to the website (assuming they are not still logged in) with their username and password.
9. Go to the "Orders" section.
10. Find that exact order.
11. Go into the order details and review the order status.

The overall problem is that the consumer is often getting old information and it takes too much time and effort to get accurate order info, sometimes having to go through multiple websites, filling out/copy-pasting into fields, etc. So customer satisfaction goes down, which is bad for the consumer and bad for the merchant.

The solution is adding a dynamic update script (see Appendix 2) to the email, so that the Order Status email always displays up-to-date information to the consumer. It changes in real-time, each time the consumer looks at the email. Note that the interactivity script and the update script may be combined into a single script.

The new solution process is:

1. Each time the consumer opens the order email, a request is sent through the backend to endpoint where order information is stored (in the online store database).
2. The request securely returns the order information. The system then updates the email with the new information, all in real-time. An "Updated at <date><time>message is used to let the consumer know the last time the date was updated.

Figure 3A:
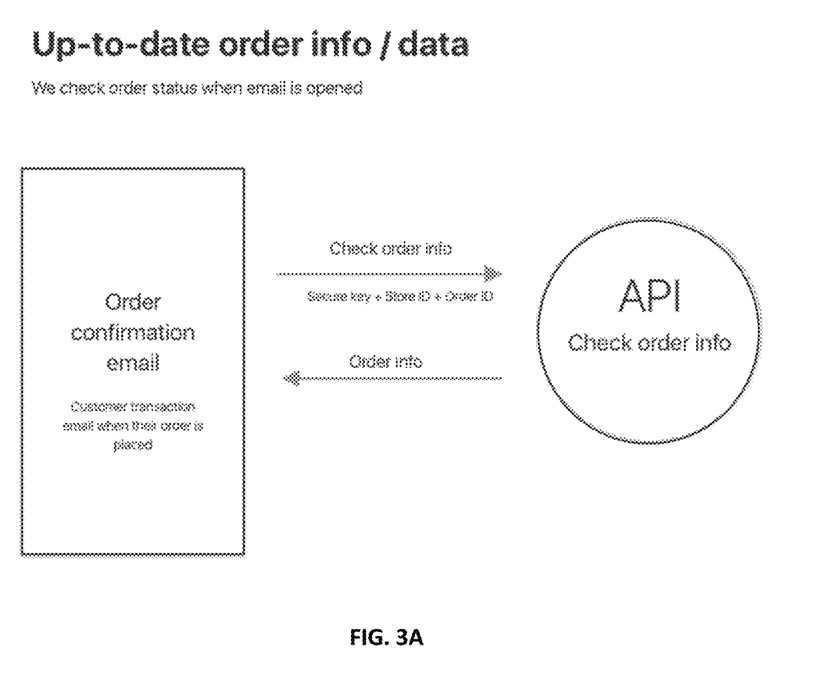
FIG. 3A shows a data flow for Up-to-date Order Notification.
Figure 3B:
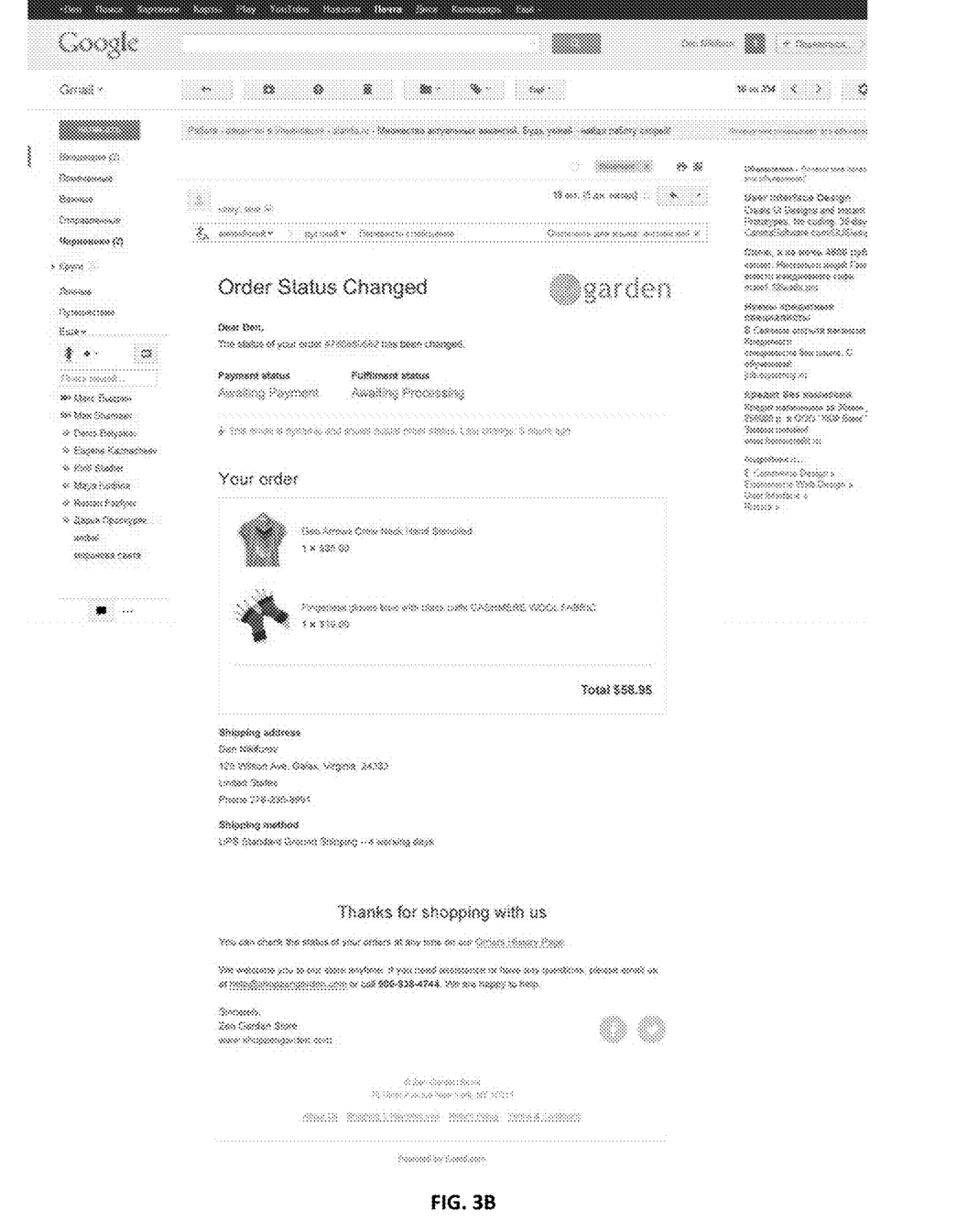
FIGS. 3B-3C show a screen shot for Up-to-date Order Notification, just after the consumer placed the order (they should be viewed as a single screenshot).
Figure 3C:
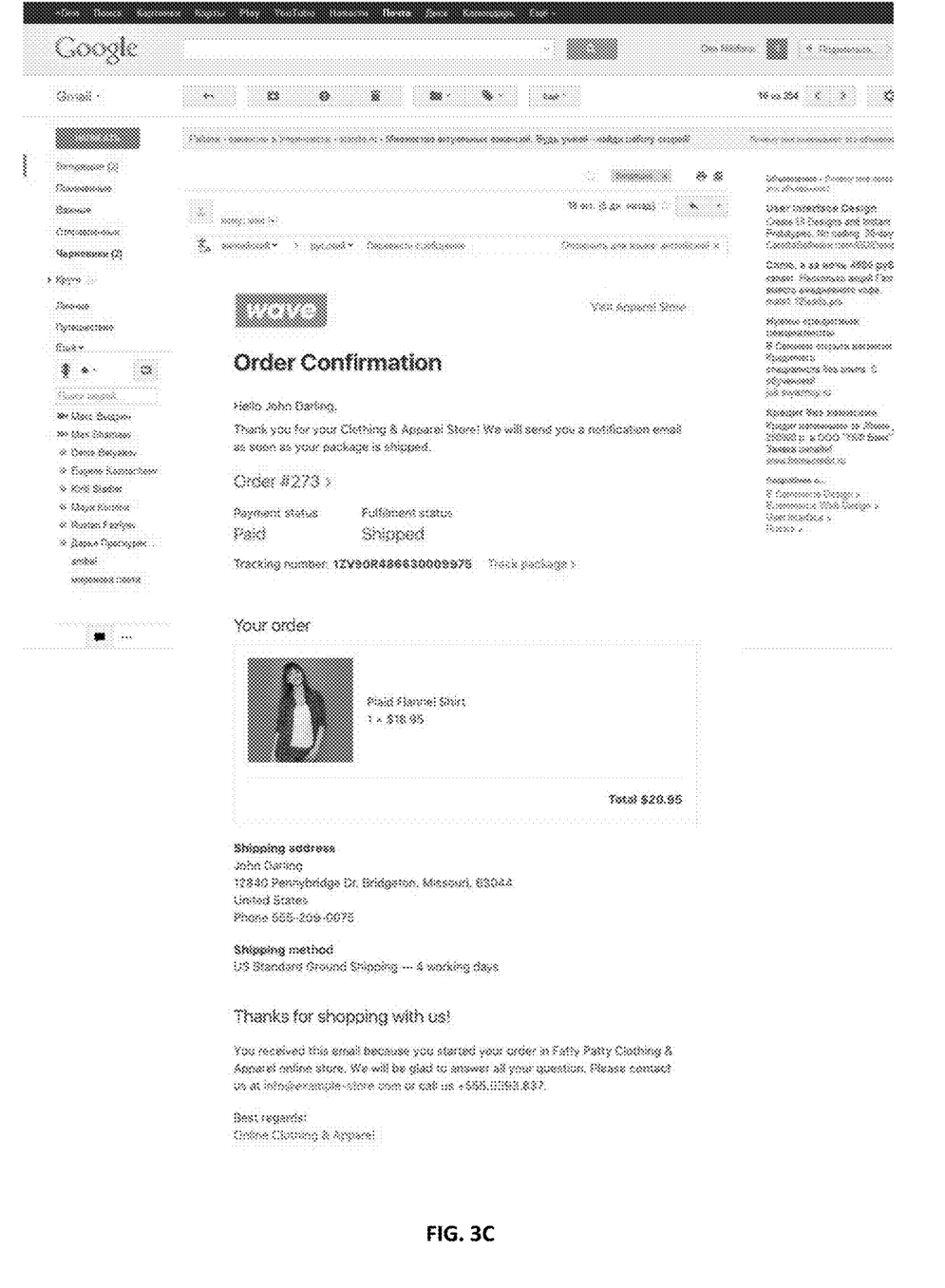

FIG. 3A shows a data flow for Up-to-date Order Notification. FIGS. 3B-3C shows a screen shot for Up-to-date Order Notification, just after the consumer placed the order. FIGS. 3D-3E show a screen shot for Up-to-date Order Notification for the same email, after the merchant changed the order status.

These figures show how Up-to-date Order Notification works. The server sends an email to the user after the user places an order online. The user receives this email with order information. Unlike traditional order notification emails, the email always presents up-to-date content regardless when the user looks at it. For example, if the order has been placed, it can say "Your order has been placed" with an order confirmation number. The user might go back to the same email the next day and the same email would say something like "Your order has been shipped" with a shipping tracking number and expected delivery date.

The email always shows the current order status when the user reviews the email, as it always checks the server (database) to be sure it has the most recent content when the email is opened, remains open over time or is otherwise visible to the user in his email client (such as in a preview in MICROSOFT OUTLOOK, where the email can be partly or wholly visible in a preview even if it is not opened in a window of its own). Unlike traditional order status, the user never has to go to the seller's website and login to get the current order status.

Also, the dynamic update script can keep the information available to the user up to date, for example, by updating links to product pages (e.g., removing links to products that are no longer available, replacing them with new products, updating number of items in stock, on back order and/or specific item availability, and permitting orders and/or re-orders from within the email).

Order Management

The overall problem is that managing orders from consumers takes too much time and effort for merchants. Order management typically includes tasks such as printing an invoice, changing the fulfillment status (e.g., "processing", "shipped", "delivered"), assigning a tracking number and making notes. When something takes merchants too much time, then it takes time away from higher-value tasks.

Additionally, when the merchant goes back to the order notification email, it is at that point sometimes out of date, rendering it useless.

The conventional process is typically as follows:

1. Consumer places an order.
2. Merchant receives an email notification that they have a new order.
3. Merchant opens the email, which generally has order information like product, quantity, and buyer.
4. Merchant goes to the eCommerce Control Panel.
5. Merchant logs in to Control Panel with username and password.
6. Merchant navigates to the Order Management page.
7. Merchant makes updates to the order.

Figure 4:
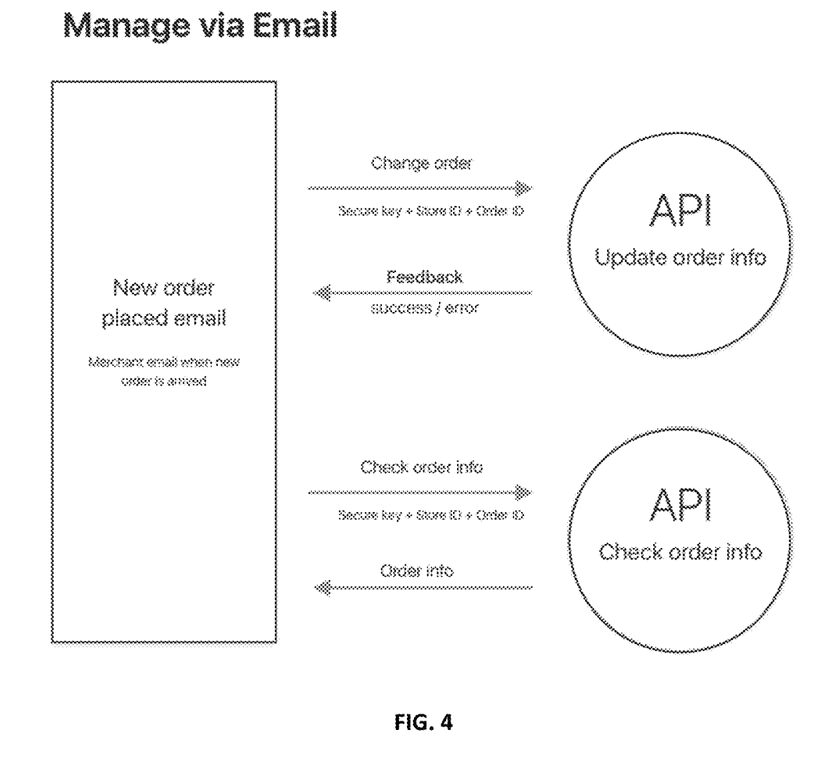
FIG. 4 shows Data Flow for Order Management.

The solution is an Order Status email that always displays up-to-date information to the consumer. It changes in real-time each time the consumer looks at the email. FIG. 4 shows Data Flow for Order Management. The new solution process is:

1. Consumer places an order.
2. Merchant receives an email notification that they have a new order.
3. Merchant opens the email and makes updates to the order directly in the email.

The new solution reduces the amount of steps the merchant needs to take from about 7 steps to about 3 steps.

Figure 5:
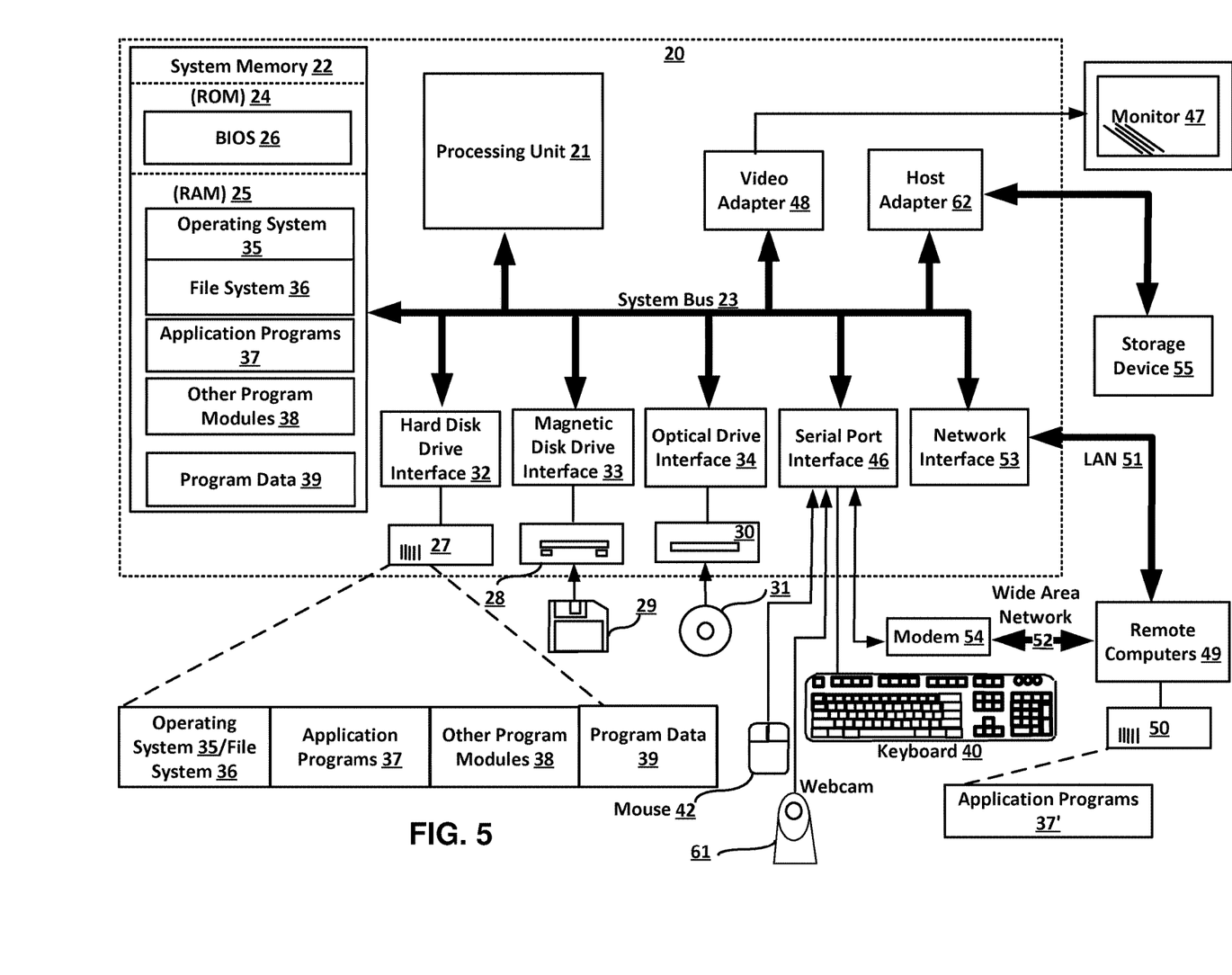
FIG. 5 shows an example of a computer or server that may be used to implement the invention.

With reference to FIG. 5, an exemplary system for implementing the invention includes a general purpose computing device in the form of a host computer or a server 20 or the like, including a processing unit (CPU) 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the computer 20, such as during start-up, is stored in ROM 24.

The computer or server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk (storage device 55), a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk (storage device 55), magnetic disk 29, optical disk 31, ROM 24 or RAM 25, including an operating system 35 (e.g., MICROSOFT WINDOWS, LINUX, APPLE OS X or similar). The server/computer 20 includes a file system 36 associated with or included within the operating system 35, such as the Windows NT™ File System (NTFS) or similar, one or more application programs 37, other program modules 38 and program data 39. A user may enter commands and information into the server 20 through input devices such as a keyboard 40, a webcam 61 and pointing device (e.g., a mouse) 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers. A host adapter 62 is used to connect to the storage device 55.

The server/computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 with application software 37' is illustrated. The logical connections include a local area network (LAN) 51 and a wide area network (WAN) 52. Such networking environments are common in offices, enterprise-wide computer networks, Intranets and the Internet.

In a LAN environment, the server/computer 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the computer or server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention.

APPENDIX 1

```
override fun doGet(req: HttpServletRequest, resp: HttpServletResponse) {
    val order = getImmutableOrder(req, resp, "orderid",
orderEntityManager, log) ?: return
        val owner = getOwner(req, resp, ownerEntityManager, log) ?: return
        val isAdminKey = getIsAdminKey(req, resp, order, log) ?:
        return          val
orderContext = getOrderLocaleContext(red.getParameter("lang"),
order, owner)
        val orderStatus =
messagesInterceptor.runInContext<OrderStatus>(orderContext) {
            val paymentStatus = order.paymentStatus
            val paymentStatusText = if (paymentStatus != null)
Messages.getString(StatusMessages.getPaymentStatusKey(paymentStatus,
owner.isNewOrderStatusesEnabled)) else null
            val fulfillmentStatusText = if (paymentStatus != null)
Messages.getString(StatusMessages.getFulfillmentStatusKey
(order.fulfillmentStatus,
owner.isNewOrderStatusesEnabled)) else null
            OrderStatus(
                paymentStatus?.toString( ),
                order.fulfillmentStatus?.toString( ),
                paymentStatusText,
                fulfillmentStatusText,
                order.trackingNumber,
                getTrackingUrl(order),
                getFulfillentStatusColor(order),
                getPaymentStatusColor(order),
                SimpleDateFormat("yyyy-MM-
dd'T'HH:mmZ").format(order.lastChangeDate),
                if (isAdminKey) order.privateAdminNotes ?: " "
else null
            )
        }
        sendResponse(
            entity = orderStatus,
            req = req,
            resp = resp,
            log = log,
            additionalInfo = getAdditionalInfoForOrder(order,
isAdminKey)
        )
}
```

APPENDIX 2

```
Live Order Status
<amp-list layout="flex-item"
src="<URL>?ID=<ID>&orderid=<orderID>&secure_key=<secure_key>single-item>
    <template type="amp-mustache">
        <div style="display: inline-block; padding: 0 50px 20px 0;">
            <div style="font-family: sans-serif; font-size: 14px; line-height: 24px;
color: #333;">
                Payment status
            </div>
            <div style="font-family:sans-serif; font-size: 24px; line-height: 30px;">
{{paymentStatusText}}
            </div>
        </div>
        <div style="display: inline-block; padding: 0px 50px 20px 0;">
```

APPENDIX 2-continued

```
      <div style="font-family: sans-serif; font-size: 14px; line-height: 24px;
color: #333;">
         Fulfillment status
      </div>
      <div style="font-family: sans-serif; font-size: 24px; line-height: 30px;
color: #{{fulfillmentStatusColor}};">
   {{fulfillmentStatusText}}
         </div>
      </div>
      <table border="0" width=3D"100%" cellpadding="0" cellspacing="0" >
         <tr>
            <td align="left" valign="top" style="font-family: sans-serif; font-
size: 14px; line-height: 24px; color: #999; padding-top:10px; border-top: 1px solid #ddd">
               <amp-img width="10px" height="16px"
src="<URL>/boltBlack.png" style="opacity: .4; position: relative; top: 2px;"></amp-img>
                  Order statuses are streamed live into this email
and are always up to date. Last status check: Just now
            </td>
         </tr>
      </table>
   </template>
</amp-list>
Welcome email
<template type="amp-mustache" id="verification">
   <div class="welcome-page_state welcome-page-state--{{store_verification_status}}
welcome-pag_state--{{code_status}}">
      <div class="welcome-page_block welcome-page-block--NOT_VERIFIED=">
         <form method="post" action-
xhr=<URL>?ownerid=<ID>&verify_code=<verify_code>" id=3D"verificationForm"
class=3D"form">
            <div class=3D"form_self>
               <div style="padding-top: 40px; padding-bottom: 20px;
text-align: center;">
                  <div>
                     <button
on=3D"tap:verificationForm.submit( )">
                        <table cellpadding=3D"0" cellspacing=3D"0"
border=3D"0" style="width: 100%; min-width: 100%;">
                           <tr>
                              <td></td>
                              <td align="center"
valign="center">Confirm email</td>
                              <td align="center"
valign="center"></td>
                           </tr>
                        </table>
                     </button>
                  </div>
               </div>
            </div>
            <div submit-success>
               <div>Your email has been confirmed</div>
               <div>
                  <div class=3D"mso-hide">
                     <a href=<URL>class="btn btn--primary
html-template-font-family>
                        Sign in
                     </a>
                  </div>
               </div>
            </div>
            <divsubmit-error>
               <div>Your email is not yet confirmed. Please sign in to the
control panel to proceed with verification.</div>
               <div>
                  <div class="mso-hide">
                     <a href=<URL>class="btn btn--primary
html-template-font-family">
                        Sign in
                     </a>
                  </div>
               </div>
            </div>
            <div submitting>
               <div class="form_loader">
      <amp-img width="38px" height="10px" src="<URL>/amp-loader.gif"></amp-img>
   </div>
</div>
         </form>
      </div>
```

APPENDIX 2-continued

```
<div class="welcome-page_block welcome-pag_ block--VERIFIED">
    <div>Your email has been confirmed</div>
    <div>
        <div class="mso-hide">
            <a href=<URL>class="btn btn--primary html-template-font-family">
                Sign in
            </a>
        </div>
    </div>
</div>
<div class="welcome-page_block welcome-page_block--EXPIRED">
    <div>Your email is not yet confirmed. Please sign in to the control panel to proceed with verification.</div>
    <div>
        <div class="mso-hide">
            <a href=<URL>class="btn btn--primary html-template-font-family">
                Sign in
            </a>
        </div>
    </div>
</div>
</template>
```

What is claimed is:

1. A system implemented using a memory and a processor for interactive e-commerce using email, comprising:
   a server running an e-commerce website and a supporting database;
   the server sending an order confirmation email to a user in response to a user purchase;
   the email containing an interactivity script and an update script;
   wherein, upon the user using an email client to render the email, the interactivity script connects to the server and provides the user with an interface within the email for feedback or review or rating to the e-commerce website regarding the user purchase, and provides a response to the feedback from the e-commerce website within the email,
   wherein, in response of the user submitting a review form or a feedback form or a rating form, a secure key, a store ID and a product ID are transmitted to the server, the server recording the information in the database, and sending a response back to the user indicating success or error;
   wherein, upon the user using the email client to render the email, the update script connects to the server and provides the user with an updated status of the purchase based on data in the supporting database, and
   wherein the update script downloads and shows a horizontal scroll with updated links to multiple products for additional purchase by the user, the additional purchase including reorders.

2. The system of claim 1, wherein the update script provides the user with shipping status of the purchase.

3. The system of claim 1, wherein the update script provides the user with updated recommendations of products for the user to purchase.

4. The system of claim 1, wherein the update script provides the user with updated prices on similar products for the user to purchase.

5. The system of claim 1, wherein the rendering includes opening a window for the email.

6. The system of claim 1, wherein the rendering includes showing a preview of the email.

7. The system of claim 1, wherein the rendering includes opening a window for the email.

8. The system of claim 1, wherein the feedback includes rating the purchase in a product review.

9. The system of claim 8, wherein the product review is provided to the e-commerce website via an API.

10. The system of claim 1, wherein the feedback includes rating the user's purchasing expenence.

11. A method for interactive e-commerce using email, comprising the steps of:
    on a server running an e-commerce website and a supporting database, the server sending an order confirmation email to a user in response to a user purchase;
    the email containing an interactivity script and an update script;
    upon the user using an email client to render the email, the interactivity script connecting to the server and providing the user with an interface within the email for feedback or review or rating to the e-commerce website regarding the user purchase, and provides a response to the feedback from the e-commerce website within the email,
    wherein, in response of the user submitting a review form or a feedback form or a rating form, a secure key, a store ID and a product ID are transmitted to the server, the server recording the information in the database, and sending a response back to the user indicating success or error; and
    upon the user using the email client to render the email, the update script connecting to the server and provides the user with an updated status of the purchase based on data in the supporting database,
    wherein the update script downloads and shows a horizontal scroll with updated links to multiple products for additional purchase by the user, the additional purchase including reorders.

12. A non-transitory computer program product for interactive e-commerce using email, comprising:
    on a server running an e-commerce website and a supporting database, computer program product means for the server to send an order confirmation email to a user in response to a user purchase, the email containing an interactivity script and an update script;

upon the user using an email client to render the email, computer program product means for the interactivity script connecting to the server and provide the user with an interface within the email for feedback or review or rating to the e-commerce website regarding the user purchase, and provides a response to the feedback from the e-commerce website within the email, wherein, in response of the user submitting a review form or a feedback form or a rating form, a secure key, a store ID and a product ID are transmitted to the server, the server recording the information in the database, and sending a response back to the user indicating success or error; and upon the user using the email client to render the email, computer program product means for the update script to connect to the server and provide the user with an updated status of the purchase based on data in the supporting database, wherein the update script downloads and shows a horizontal scroll with updated links to multiple products for additional purchase by the user, the additional purchase including reorders.

* * * * *